Patented July 31, 1951

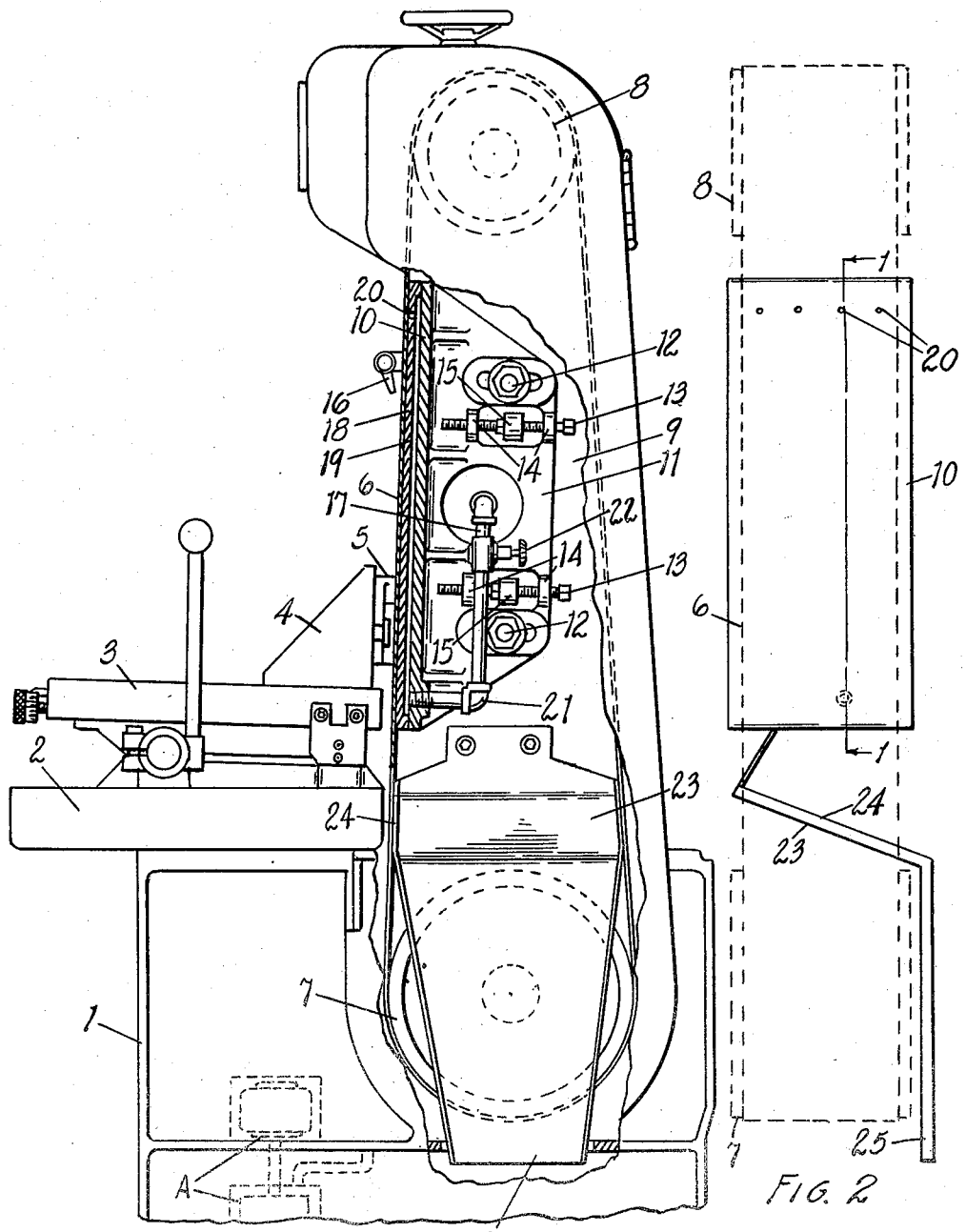

2,562,229

UNITED STATES PATENT OFFICE 2,562,229

BELT GRINDING MACHINE

Ramsay M. Bell, Kalamazoo, Mich., assignor to Hammond Machinery Builders, Inc., Kalamazoo, Mich.

Application December 12, 1946, Serial No. 715,870

13 Claims. (Cl. 51—141)

This invention relates to improvements in a belt grinding machine.

The principal objects of this invention are:

First, to reduce the operating temperatures of the work piece, belt and platen of a belt grinding machine.

Second, to reduce the wear of the belt and belt supporting platen of a belt grinding machine.

Third, to reduce the current consumption of a belt grinding machine.

Other objects and advantages pertaining to the economies and details of this invention will be apparent from the following description and claims.

The drawings, of which there is one sheet, illustrate a preferred form of the belt grinder with the cooling mechanism installed thereon.

Fig. 1 is a fragmentary side elevational view of a belt grinding machine embodying the invention partially broken away and partially in section, and certain of the parts being shown conventionally.

Fig. 2 is a fragmentary front elevational view of the platen and coolant doctor and its associated chute illustrated in Fig. 1, the grinding belt and pulleys therefor being shown in their relative positions in dotted lines.

The reference character 1 indicates the base of a belt grinder having a transversely reciprocable carriage 2 with a longitudinally reciprocable work table 3 mounted thereon. The work table 3 carries a work holder 4 for supporting a work piece indicated at 5 in grinding relationship with an abrasive belt 6. The belt 6 is trained about a lower driving pulley 7 mounted in the base 1 and an idler pulley 8 mounted on a pedestal 9 extending upwardly from the base. The front side of the belt is supported against the work piece 5 by a platen 10 having a rearwardly extending reinforcing flange 11 which is adjustably secured to the pedestal 9 by means of bolts 12 extending through slots in the flange. Adjusting screws 13 are provided which extend through ears 14 on the flange and central ears 15 mounted on the pedestal maintain the platen in proper alignment with the belt and work table.

The grinder includes a suitable motor for driving the driving pulley 7 and a suitable coolant pump and motor conventionally illustrated at A for circulating a cooling fluid to the nozzle 16 positioned in front of the belt and to a pipe 17 in back of the platen 10. The motors and coolant pump are of suitable construction not part of this invention and so are not illustrated in greater detail in the drawings. The coolant may be any of the well-known types of cutting and cooling liquids.

It has previously been the practice to lubricate and cool the working surface of the belt by delivery of the coolant through a nozzle similar to that shown at 16 and to cool the platen 10 by circulating coolant through a coolant jacket in the platen.

The platen of this invention comprises a face plate 18 which is cut away on its rear side to coact with the body of the platen in providing a relatively shallow coolant chamber 19 substantially co-extensive with the face of the platen. The face of the platen is provided with delivery ports or holes 20, preferably arranged in a horizontal series adjacent the top of the plate and through which coolant is discharged to the inner surface of the downward reach of the grinding belt, serving not only to cool the belt and the platen but also to very materially reduce friction and wear between the belt and the platen. It will be noted that the platen extends well above the work support but is disposed to take the thrust of the work.

The coolant is supplied to the chamber 19 by the pipe 21 which is desirably provided with a valve 22 for regulating the amount of coolant delivered to the platen. The coolant is supplied to the platen chamber under substantial pressure to insure flowing through the coolant chamber in substantial quantities and also to insure delivery at the upper end of the platen. Desirably the capacity of the discharge port is somewhat below the amount of coolant supplied.

The coolant discharged between the belt and the platen escapes from the bottom of the platen and to prevent its being discharged to the driving pulley I provide a doctor bar 24 which constitutes a flange for the chute 23. The upper part of the chute is inclined and the doctor bar is also inclined to direct the fluid from the pulley 7. The lower end 25 of the chute discharges to the sump. As there is normally some coolant that passes the doctor I preferably roughen the surface of the driving pulley 7 to increase its driving friction with the belt.

I have found that by circulating the coolant both through the platen and between the platen and the belt that the temperature of the belt, platen and work piece is greatly reduced and that the friction between the belt and the face plate is also reduced, materially lowering the amount of current necessary to drive the motor and belt. I have made a series of tests to demonstrate the efficiency of this cooling system. In the first test coolant was supplied through the platen and allowed to escape between the belt and the face plate. No coolant was supplied along the working face of the belt. In the second test coolant was supplied only to the working face of the belt and not to the platen. In the third test coolant was supplied both to the working face of the belt and to the rear face of the belt through the platen. The results of these tests are tabulated below. In all tests like grinding pressures and work pieces were used.

| Resulting Averages | Test #1 | Test #2 | Test #3 |
| --- | --- | --- | --- |
| Work Temp. at end of grind___° F__ | 300 | 91 | 89 |
| Platen Temp. at end of grind_° F__ | 69 | 149 | 68 |
| Current input, in Amperes_____ | 4.8 | 7.0 | 4.5 |
| Stock removed_____oz__ | ¾ | ¾ | ¾ |
| Coolant flow Platen_____qt__ | 1½ | None | 1½ |
| Coolant flow Work_____gal__ | None | 8 | 8 |

It will be noted that the addition of the coolant to the back side of the belt and the platen to the supply of coolant to the working face of the belt as indicated in test #3 materially reduces the temperature of the platen and current input below that in the test where coolant was supplied only to the working face of the belt as shown in the results of test #2. The amount of work performed on the work piece as indicated by the stock removed remained the same so far as the accuracy of the tests could determine.

The effective reduction of operating temperatures in the work, belt and platen is highly important but there is the additional factor of importance in that there is substantial reduction in the amount of current consumed. The wear on the belt and on the platen is very greatly reduced and danger of the platen warping as a result of high temperatures is eliminated.

I have illustrated and described my invention in a highly practical commercial embodiment thereof so that others may reproduce the same with such minor modifications thereof as are desired without further disclosure.

Having thus described my invention what I claim as new and desire to secure by Letters Patent is:

1. The combination in a grinding machine including an abrasive belt, vertically spaced supporting and driving pulleys therefor and a work support operatively associated with the downwardly moving reach of the belt, of a belt supporting platen having a flat substantially continuous belt engaging surface operatively associated with the downwardly moving reach of the belt in opposed relation to the work support, said platen extending substantially above the work support and being provided with a relatively shallow liquid coolant chamber approximately co-extensive with the face thereof, means for applying liquid coolant under pressure to the bottom of the chamber, the face of the platen having a horizontal series of coolant discharge ports adjacent the top thereof discharging liquid coolant against the rear side of the belt, a doctor disposed below said platen in operative relation to the inner side of the belt and above the lower pulley, and a discharge chute operatively associated with said doctor.

2. The combination in a grinding machine including an abrasive belt, vertically spaced supporting and driving pulleys therefor and a work support operatively associated with the downwardly moving reach of the belt, of a belt supporting platen having a flat substantially continuous belt engaging surface operatively associated with the downwardly moving reach of the belt in opposed relation to the work support, said platen extending substantially above the work support and being provided with a relatively shallow coolant chamber approximately co-extensive with the face thereof, and means for supplying liquid coolant under pressure to the bottom of the chamber, the face of the platen having a horizontal series of coolant discharge ports adjacent the top thereof discharging liquid coolant against the rear side of the belt.

3. The combination in a grinding machine including an abrasive belt, vertically spaced supporting and driving pulleys therefor and a work support operatively associated with the downwardly moving reach of the belt, of a belt supporting platen having a flat substantially continuous belt engaging surface operatively associated with the downwardly moving reach of the belt in opposed relation to the work support, said platen extending substantially above the work support and being provided with a coolant chamber, means for supplying liquid coolant to the chamber, the face of the platen having coolant discharge ports adjacent the top thereof discharging liquid coolant against the rear side of the belt, a doctor disposed below said platen in operative relation to the inner side of the belt and above the lower pulley, and a discharge chute operatively associated with said doctor.

4. The combination in a grinding machine including an abrasive belt, vertically spaced supporting and driving pulleys therefor and a work support operatively associated with the downwardly moving reach of the belt, of a belt supporting platen having a flat substantially continuous belt engaging surface operatively associated with the downwardly moving reach of the belt in opposed relation to the work support, said platen extending substantially above the work and being provided with a coolant chamber, and means for supplying liquid coolant to the chamber, the face of the platen having coolant discharge ports adjacent the top thereof discharging liquid coolant against the rear side of the belt.

5. The combination in a grinding machine including an abrasive belt and vertically spaced supporting and driving pulleys therefor, of a belt supporting platen having a flat substantially continuous belt engaging surface operatively associated with the inside of the downwardly moving reach of the belt and having a relatively shallow coolant chamber approximately co-extensive with the belt supporting face thereof, means for supplying liquid coolant adjacent the bottom of the chamber, the face of the plate having the coolant discharge ports adjacent the upper end of the platen discharging liquid coolant against the inner side of the belt, a doctor disposed below said platen in operative relation to the inner side of the belt and above the lower pulley, and a discharge chute operatively associated with said doctor.

6. The combination in a grinding machine including an abrasive belt and vertically spaced supporting and driving pulleys therefor, of a belt supporting platen having a substantially continuous belt engaging surface operatively associated with the inside of the downwardly moving reach of the belt and having a relatively shallow coolant chamber approximately co-extensive with the belt supporting face thereof, and means for supplying liquid coolant adjacent the bottom of the chamber, the face of the plate having the coolant discharge ports adjacent the upper end of the platen discharging liquid coolant against the inner side of the belt.

7. The combination in a belt grinding machine of a vertically disposed driven abrasive belt, a work thrust sustaining platen having a substantially continuous belt engaging surface operatively associated with the downward reach of the belt and disposed on the inner side thereof, the platen constituting the front wall of a coolant chamber and having ports adjacent its upper end discharging upon the inner side of the belt, and means for supplying liquid coolant to said chamber at a point remote from said ports whereby circualtion through the chamber is promoted.

8. The combination in a belt grinding machine of a vertically disposed abrasive belt, a flat work thrust sustaining platen operatively associated with the downward reach of the belt and disposed on the inner side thereof, and means for discharging liquid coolant between the platen and belt adjacent the upper end of the platen.

9. In combination with a belt grinding machine having a grinding belt and driving means therefor, a coolant circulating system in said machine for supplying cooling liquid to the working face of said belt, a platen having a uniform outer face for supporting the back of said belt opposite the working face thereof and having a coolant chamber therein, the face of the platen constituting the front wall of the chamber and defining a series of small holes near the upper edge thereof opening to the rear surface of said belt, a conduit for supplying liquid coolant to the bottom of said coolant chamber from said circulating system, a valve interposed in said conduit, and a doctor positioned between said platen and said driving means and provided with means for returning coolant to said circulating system.

10. The combination in a grinding machine including an abrasive belt and vertically spaced driving and supporting pulleys therefor, and a work support operatively associated with the downwardly moving reach of the belt, of a belt supporting platen having a flat belt supporting face operatively associated with the rear side of the downwardly moving reach of the belt in opposed relation to and extending substantially above the work support, said platen being provided with a coolant chamber approximately coextensive with the belt supporting face thereof, means for supplying a lubricating liquid coolant to the chamber under pressure, the face of the platen having coolant discharge ports adjacent to but below the upper end thereof, said ports discharging against the rear side of the downwardly traveling reach of the belt below the upper end of the belt contacting face of the platen, the belt acting to spread and carry the coolant downwardly between the belt and the face of the platen, the capacity of the supply means being such as to discharge liquid coolant under pressure through the said ports and to maintain circulation of the coolant through said chamber.

11. The combination in a grinding machine including an abrasive belt and vertically spaced driving and supporting pulleys therefor, and a work support operatively associated with the downwardly moving reach of the belt, of a belt supporting platen having a smooth regular belt supporting face operatively associated with the rear side of the downwardly moving reach of the belt in opposed relation to and extending substantially above the work support, the face of the platen having liquid discharge ports adjacent to but below the upper end thereof, discharging against the rear side of the downwardly traveling reach of the belt below the upper end of the belt contacting face of the platen, the belt acting to spread and carry the liquid downwardly between the belt and the face of the platen, and means for supplying liquid under pressure through the said ports.

12. The combination in a grinding machine including an abrasive belt and vertically spaced driving and supporting pulleys therefor, of a belt supporting platen having a smooth regular face operatively associated with the rear side of the downwardly moving reach of the belt, said platen being provided with a liquid chamber approximately coextensive with the belt supporting face thereof, the face of the platen having liquid discharge ports across which the downwardly moving reach of the belt sweeps, whereby liquid is discharged through said ports against the rear side of the downwardly moving reach of the belt below the upper end of the belt supporting face of the platen, the belt acting to spread and carry the liquid downwardly between the face of the belt and the platen, and means for supplying liquid to said chamber and discharging through said ports under pressure.

13. The combination in a grinding machine including an abrasive belt and vertically spaced driving and supporting pulleys therefor, of a belt supporting platen having a smooth regular face operatively associated with the rear side of the downwardly moving reach of the belt, said platen being provided with liquid discharge ports across which the downwardly moving reach of the belt sweeps, whereby liquid is discharged against the rear side of the downwardly moving reach of the belt below the upper end of the belt supporting face of the platen, and means for supplying liquid to said ports under pressure.

RAMSAY M. BELL.

REFERENCES CITED

The following references are of record in the file of this patent:

UNITED STATES PATENTS

| Number | Name | Date |
|---|---|---|
| 2,261,244 | Fowler | Nov. 4, 1941 |
| 2,279,782 | Fowler | Apr. 14, 1942 |
| 2,279,783 | Fowler | Apr. 14, 1942 |
| 2,280,762 | Phipps | Apr. 21, 1942 |
| 2,359,488 | Ponder | Oct. 3, 1944 |
| 2,367,107 | Emmons | Jan. 9, 1945 |

FOREIGN PATENTS

| Number | Country | Date |
|---|---|---|
| 13,061 | Australia | May 14, 1929 |